UNITED STATES PATENT OFFICE.

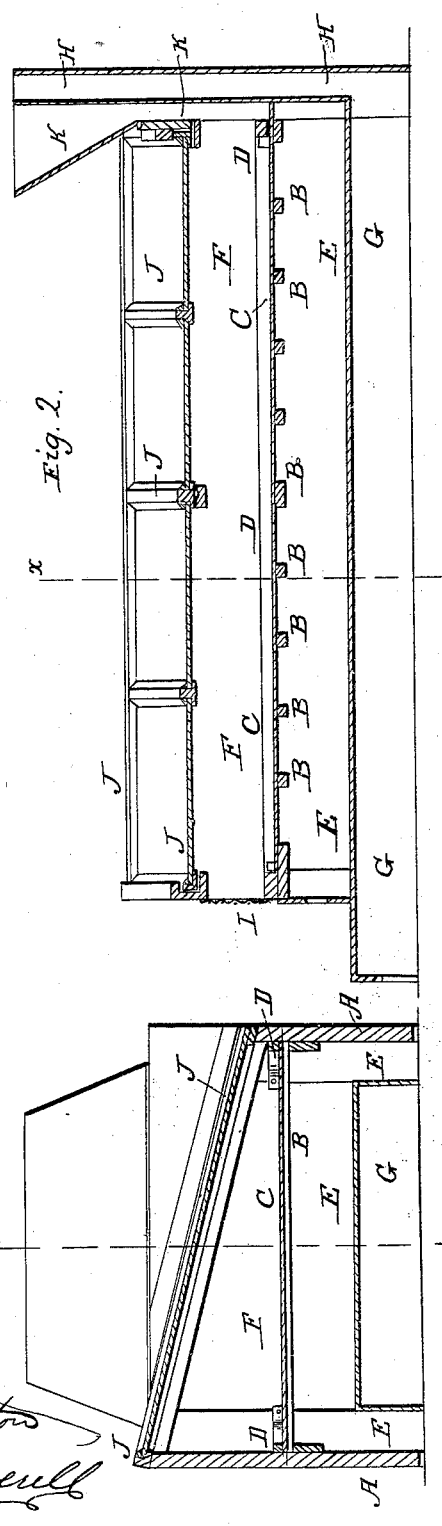

WM. D. FISHER AND WM. HOLLY, OF FREEPORT, ILLINOIS.

FRUIT-DRIER.

Specification forming part of Letters Patent No. 57,885, dated September 11, 1866.

*To all whom it may concern:*

Be it known that we, WILLIAM D. FISHER and WILLIAM HOLLY, of Freeport, in the county of Stephenson and State of Illinois, have invented a new and useful Improvement in Fruit-Drier; and we do hereby declare that the following is a full, clear, and exact description thereof, which will enable others skilled in the art to make and use the same, reference being had to the accompanying drawings, forming part of this specification, in which—

Figure 1 is a vertical cross-section of our improved fruit-drier, taken through the line $x$ $x$, Fig. 2. Fig. 2 is a vertical longitudinal section of the same, taken through the line $y$ $y$, Fig. 1.

Similar letters of reference indicate like parts.

Our invention has for its object to furnish an improved fruit-drier, by means of which fruit can be dried expeditiously and thoroughly, and during the process can be protected from rain, dust, and insects; and it consists first, in a double flue, in combination with the furnace and drying-chamber of a fruit-drier, for the purpose of causing a draft through said drying-chamber; and, second, in a fruit-tray formed of lath and canvas, in combination with the furnace and drying-chambers, and with the walls of a fruit-drier, the whole being constructed and arranged as hereinafter more fully set forth.

A are the side walls of the drier, which may be made of brick, stone, iron, or wood, as may be most convenient. Upon the upper part of these walls are formed notches or beds, in which rest the ends of the lath B, as shown in Fig. 1. C is the canvas, which, in connection with the lath B, forms the fruit-tray. The edges of this canvas may be attached to a light frame-work, D, to keep the said canvas straight and smooth.

Within the furnace-chamber E is placed the furnace G, which extends the entire length of the drier, as shown in Fig. 2. At the rear end of the drier the furnace connects with a vertical flue, H, which passes up at the end and outside of the furnace and drying-chambers E and F. Beneath or near the lower edges of the walls A are formed openings through which air may enter the furnace-chamber E to supply the place of that which has been heated and has risen through the fruit-tray and fruit that separate the chambers E and F. The front end of the drying-chamber F is formed of a piece of fine wire-gauze, I, which will admit air to the chamber, but keep out everything else. The cover J of the chamber F is formed of glass set in a sash-frame, as represented in the drawings. This cover or roof J serves two purposes. It protects the fruit from rain, dust, &c., and at the same time it intensifies the effect of the rays of the sun.

To enable it to effect these objects more effectually it is set inclined as shown in the drawings. The cover J is also removable, being set in grooves, as shown in Fig. 2, to enable it to be put on and removed at pleasure. The rear end of the drying-chamber F communicates with the flue K, through which the air that has become loaded with moisture from the fruit escapes to be succeeded by fresh dry and warm air to continue the process of drying the fruit.

To cause a draft through the flue K and secure a rapid change of air the partition between the flues H and K is made of sheet metal or other thin material that is a good conductor of heat, so that the flue K may be warmed from the flue H, and a draft formed through it.

What we claim as new, and desire to secure by Letters Patent, is—

1. The double flue H K, in combination with the furnace and with the drying-chamber, of a fruit-drier, substantially as described, and for the purpose set forth.

2. The fruit-tray formed of lath B and canvas C, in combination with the furnace and drying-chambers of the fruit-drier, substantially as described, and for the purpose set forth.

W. D. FISHER.
WM. HOLLY.

Witnesses:
J. C. KEAN,
L. W. GUITEAU.